(12) United States Patent
Daly et al.

(10) Patent No.: US 9,178,441 B2
(45) Date of Patent: Nov. 3, 2015

(54) POWER CONVERTER CONTROL TO AVOID IMBALANCE AND TRANSFORMER SATURATION

(71) Applicant: Analog Devices, Inc., Norwood, MA (US)

(72) Inventors: Michael Daly, San Jose, CA (US); Subodh Madiwale, San Jose, CA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 14/280,064

(22) Filed: May 16, 2014

(65) Prior Publication Data

US 2014/0340939 A1 Nov. 20, 2014

Related U.S. Application Data

(60) Provisional application No. 61/824,852, filed on May 17, 2013.

(51) Int. Cl.
*H02M 3/337* (2006.01)
*H02M 1/40* (2007.01)

(52) U.S. Cl.
CPC .............. *H02M 3/3376* (2013.01); *H02M 1/40* (2013.01)

(58) Field of Classification Search
CPC .............. H02M 2001/0058; H02M 2001/0032
USPC ............. 363/16, 17, 20, 21.01–21.07, 97, 98, 363/131–132
See application file for complete search history.

(56) References Cited

U.S. PATENT DOCUMENTS

| | | | |
|---|---|---|---|
| 6,016,258 A * | 1/2000 | Jain et al. | 363/17 |
| 6,246,599 B1 * | 6/2001 | Jang et al. | 363/132 |
| 6,353,547 B1 * | 3/2002 | Jang et al. | 363/132 |
| 7,102,251 B2 * | 9/2006 | West | 307/64 |
| 7,529,108 B2 | 5/2009 | Bakker | |
| 8,040,695 B2 * | 10/2011 | Reilly | 363/17 |
| 8,792,255 B2 * | 7/2014 | Kim et al. | 363/21.02 |

(Continued)

OTHER PUBLICATIONS

Andreycak, Bill, "Design Review: 500 Watt, 40W/in3 Phase Shifted ZVT Power Converter", (Mar. 25, 1993), 21 pgs.

(Continued)

*Primary Examiner* — Timothy J Dole
*Assistant Examiner* — Yusef Ahmed
(74) *Attorney, Agent, or Firm* — Schwegman Lundberg & Woessner, P.A.

(57) ABSTRACT

A switched-mode power conversion circuit can include a switch control circuit including switch control outputs coupleable to switches included in a bridge network, the switches controllably coupling power input nodes to an isolation transformer according to switch states established by the switch control circuit. A current monitoring circuit can be coupled to the isolation transformer, the current monitoring circuit including an output indicative of a current flowing through a winding of the isolation transformer. A sampling circuit can be coupled to the output of the current monitoring circuit to obtain information indicative of a first current peak during a first sampling duration corresponding to a first current polarity established by the bridge network and a second current peak during a second sampling duration corresponding to an opposite second current polarity established by the bridge network.

20 Claims, 6 Drawing Sheets

(56) References Cited

U.S. PATENT DOCUMENTS

| | | | |
|---|---|---|---|
| 8,804,375 B2* | 8/2014 | Manabe et al. | 363/17 |
| 2002/0054498 A1* | 5/2002 | Cho et al. | 363/132 |
| 2005/0078491 A1* | 4/2005 | Song et al. | 363/17 |
| 2008/0158914 A1* | 7/2008 | Bakker | 363/17 |
| 2008/0198631 A1* | 8/2008 | Zeng et al. | 363/17 |
| 2010/0128498 A1* | 5/2010 | Nymand | 363/17 |
| 2014/0334195 A1* | 11/2014 | Nussbaum et al. | 363/21.04 |

OTHER PUBLICATIONS

Balough, Laszlo, "Design Review: 100W, 400kHZ, DC/DC Converter With Current Doubler Synchronous", (Aug. 30, 2001), 26 pgs.

* cited by examiner

US 9,178,441 B2

POWER CONVERTER CONTROL TO AVOID IMBALANCE AND TRANSFORMER SATURATION

CLAIM OF PRIORITY

This patent application claims the benefit of priority of Daly, et al., U.S. Provisional Patent Application Ser. No. 61/824,852 entitled "POWER CONVERTER CONTROL TO AVOID IMBALANCE AND TRANSFORMER SATURATION," filed on May 17, 2013, which is hereby incorporated by reference herein in its entirety.

BACKGROUND

A switched-mode power converter can be implemented using a full-bridge power converter configuration, such as for an application where an alternating current (AC) input or a direct current (DC) input is provided, and a DC output is to be generated (or vice versa, such as for bi-directional conversion). For example, for single-phase AC input, four switches (e.g., transistors) can be used to direct a current through a primary winding of an isolation transformer. During a first switching phase, the switches can be controlled such that current having a first polarity is conducted through the primary winding. During a second switching phase, the switches can be controlled such that the primary winding conducts a current having a polarity opposite the first polarity.

A secondary side of the isolation transformer can include one or more windings electrically coupled to a rectification circuit, the output of which can be used to provide power to other circuitry. The rectification circuit can be coupled to an inductor. The during switching phases where power is transferred from the primary winding to the second winding, the current in the inductor can be ramped up, and during other portions of the switching cycle, the current in the inductor can ramp down, thereby generating an output voltage.

OVERVIEW

As mentioned above, a switched-mode power converter can include a transformer-coupled configuration, such as including an isolation transformer. A bridge network can be used to controllably couple an input voltage (e.g., an alternating-current (AC) source or a direct current (DC) source) to a primary winding of the isolation transformer, such as using a first current polarity during a first switching phase, and an opposite second polarity during a second switching phase. During a first switching phase, for example, a magnetic flux is established in the transformer. Such flux can be concentrated particularly in a highly magnetically-permeable core material of the transformer if the transformer includes such a core material (e.g., steel, iron, ferrite, or one or more other materials). During a second switching phase, an opposing magnetic flux is established. Generally, the time-averaged flux in the transformer should be about zero, to avoid saturation of the core material of the transformer. Such saturation can lead to poor efficiency, such as high losses or heat generation, or may even damage one or more of the switches in the bridge network or the transformer. In general, balancing of the opposing magnetic fluxes induced during first and second switching phases can be referred to as maintaining a "volt-second" balance, because such a flux can be proportional to an integral of a terminal voltage of at a winding of the transformer with respect to time over a duration of a switching cycle, such as can be expressed in units of "volt-seconds."

The present inventors have recognized, among other things, that a problem to be solved is to provide a power converter control scheme that avoids volt-second imbalance without requiring the use of a blocking capacitor in series with a transformer winding (particularly in series with a higher-voltage primary winding), or without requiring current mode control (CMC) to avoid transformer saturation. Such a scheme should also continue to operate properly in the presence of transformer saturation to reduce or minimize such saturation should it occur.

By contrast, use of a blocking capacitor can significantly increase costs or can decrease reliability, and using CMC techniques can be complex, such as including slope compensation for duty cycles in excess of 50%. Accordingly, the present inventors have developed a switched-mode power conversion circuit that can include a switch control circuit including switch control outputs coupleable to switches included in a bridge network, the switches controllably coupling power input nodes to an isolation transformer according to switch states established by the switch control circuit. In an example, a current monitoring circuit can be coupled to the isolation transformer, the current monitoring circuit including an output indicative of a current flowing through a winding of the isolation transformer. A sampling circuit can be coupled to the output of the current monitoring circuit to obtain information indicative of a first current peak during a first sampling duration corresponding to a first current polarity established by the bridge network and a second current peak during a second sampling duration corresponding to an opposite second current polarity established by the bridge network.

In an example, such as including a digital control loop, an analog-to-digital converter can include an input coupled to the sampling circuit, the analog-to-digital converter including a digital output indicative of the first current peak and the second current peak. The switch control circuit can be coupled to the digital output of the analog-to-digital converter, and the switch control circuit can include a difference circuit comprising inputs respectively arranged to receive the digital output indicative of the first current peak and the second current peak, and a digital output indicative of a difference between the first and second current peaks. The switch control circuit can include an input coupled to the digital output indicative of a difference between the first and second current peak. In an example, the switch control circuit can implement a control scheme to provide an on-duration of one or more switches in the bridge circuit established at least in part to reduce an amplitude difference between the first and second current peaks. Other inputs can be provided to the control circuit, such as used for feedback to maintain both a "volt-second" balanced transformer condition while also providing a regulated output voltage of the power conversion circuit.

This overview is intended to provide an overview of subject matter of the present patent application. It is not intended to provide an exclusive or exhaustive explanation of the invention. The detailed description is included to provide further information about the present patent application.

Figure 1:
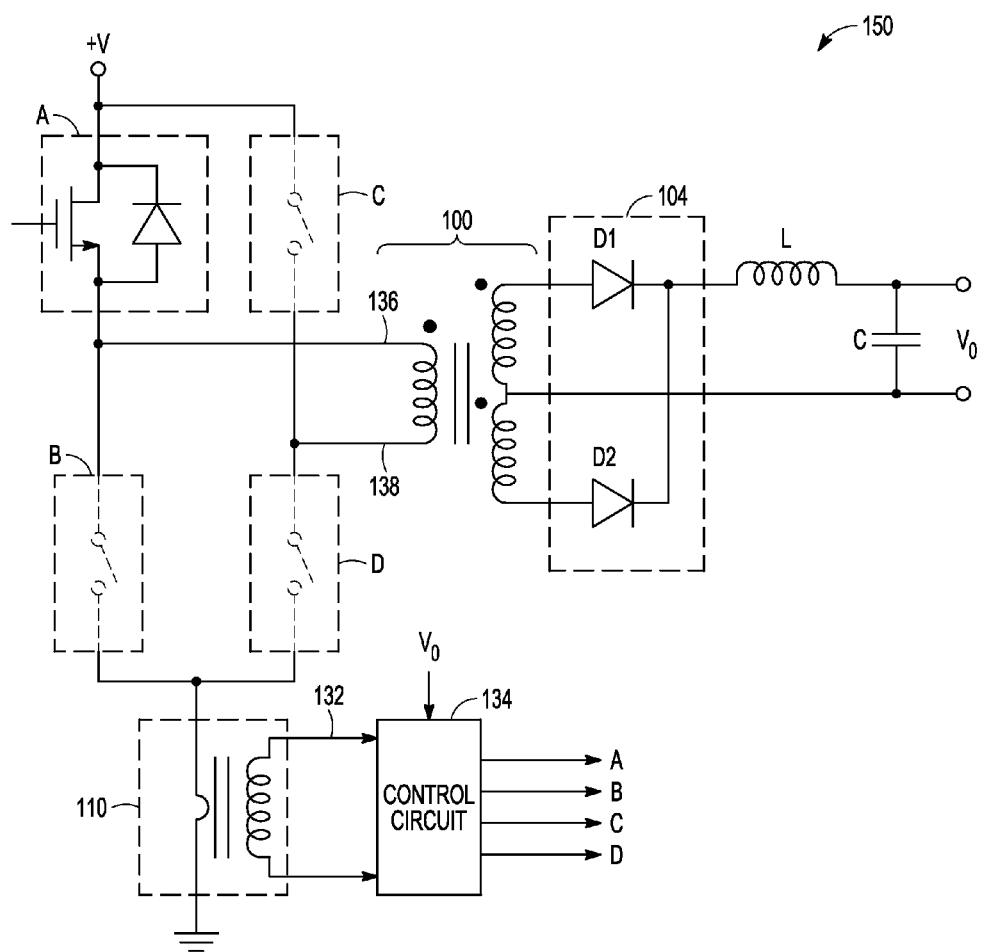
FIG. 1 illustrates generally at least a portion of a switched-mode power converter circuit, such as can include an isolation transformer comprising a primary side coupled to an input voltage via a switching network, and an output secondary side coupled to one or more of a rectifier network or a filter network.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 illustrates generally at least a portion 150 of a switched-mode power converter circuit, such as can include an isolation transformer 100 comprising a primary side (e.g., a primary winding) coupled to an input voltage, "+V," via a switching network, and an output secondary side (e.g., including one or more windings) coupled to one or more of a rectifier circuit 104 (e.g., a rectifier network) or a filter circuit (e.g., including one or more of an inductor L or a capacitor C). Generally, switched-mode power converter can use the transformer 150 and switching circuitry (e.g., switches A through D) to convert an input signal (such as a direct current (DC) source) provided across an input node +V and a reference node, to a desired output, $V_O$. Such an input can be balanced or single-ended in polarity. For example, an alternating current input can be stepped down and rectified to provide an intermediate-valued DC supply, +V, for input to the circuit shown in FIG. 1.

The secondary side of the transformer 100 can be coupled to the output $V_O$, such as through a full-wave rectifier circuit 104 or other rectification scheme (as in examples where a DC output voltage is desired at $V_O$). The filter network can include one or more energy storage elements, such as the series inductor L, which can store energy during one or more "charging" phases wherein the current through the inductor L is ramped up, and then such an inductor L can discharge at least a portion of such stored energy into a load connected to the output $V_O$, such as during a "discharge" portion of a switching cycle. A duty cycle of such charging phases can be varied, such as to provide a regulated output $V_O$.

In an example, the switches A though D can be controlled such as using a pulse-width modulation (PWM) control scheme, at least in part using feedback that is provided via monitoring a current through the transformer 100, such as under the control of the controller circuit 134, which can generate outputs (e.g., pulse-width-modulated outputs) to control the conduction states of switches A through D. The outputs of the controller circuit 134 need not be directly coupled to the switches A through D. For example, control outputs of the controller circuit 134 labeled A through D can be coupled to respective switches A through D such as using appropriate switch control drive circuitry, such as can include one or more of a solid-state, optically-coupled, or transformer-coupled drive circuit. For example, a respective control output, A of the controller circuit 134 can be coupled to switch, A, such as using a pulse transformer to provide a gate drive signal to switch A where switch A includes a field effect transistor (FET) or isolated gate bipolar transistor (IGBT) having a gate terminal.

A current monitoring circuit 110 can include using a current-to-voltage transformer (e.g., a "current transformer"), such as including an output 132 coupled to a control circuit 134. Such a current monitoring circuit 110, along with one or more other inputs such as an input coupled to the output $V_O$, can be used as a portion of a feedback control loop to provide switch control outputs to control conduction of the switches A through D. The current monitoring circuit 110 is shown in series with a reference node in FIG. 1. However, the techniques and circuits described herein can be used in a configuration wherein the current monitoring circuit 110 is located else, such as in series with the primary winding of the transformer 100 at a location of a first terminal 136 or a second terminal 138.

In the example of FIG. 1, switch A is shown illustratively as a transistor (e.g., a FET). Other solid-state or mechanical switching devices can be used for one or more of the switches A through D, such as a bipolar junction transistor, an IGBT, or other device. The configuration of switches A through D shown in FIG. 1 illustrates generally a bridge network, such as can be referred to as an "H" bridge. Such a bridge can allow coupling of input nodes (such as +V and a reference node) to the primary side of the transformer 100 in a configuration having a first polarity (such as when switches A and D are closed, and switches B and C are open), and an opposite second polarity (such as when switches B and C are closed, and switches A and D are open). Such a configuration can be expanded if more than a single AC input phase is used (e.g., if additional alternating current input nodes are provided, the bridge network can be expanded to include additional switches to couple such addition input nodes to the primary side of the transformer 100 according to a specified sequence of states).

PWM feedback control of the switch A through D states can provide desired output characteristics, such as regulating $V_O$ to establish a specified voltage range across a variety of load conditions, while also avoiding or reversing transformer 100 saturation. As mentioned above, such transformer 100 saturation can cause undesired deviation in output $V_O$ characteristics or can cause damage to the components of the power converter. In one approach, such a feedback control technique can include a "time integral of transformer current technique," which, as explained below, may become ineffective if the transformer saturates, due to waveform distortion. By contrast, as discussed in other examples, a peak transformer current monitoring technique can be effective at both avoiding transformer saturation. Such a peak monitoring technique can also be effective at restoring operation to reduce or minimize such transformer saturation.

While the example of FIG. 1 implies unidirectional power transfer from the primary side of the transformer 100 to the secondary side, the techniques described herein are equally applicable to reversed or bi-directional power transfer schemes. Also, rectifiers such as D1 and D2 are shown as passive structures, however other topologies can be used such as replacing such rectifiers with switches (e.g., transistors), such as to provide the ability to provide bidirectional current flow or to provide enhanced efficiency through reduced rectification losses.

Figure 2A:
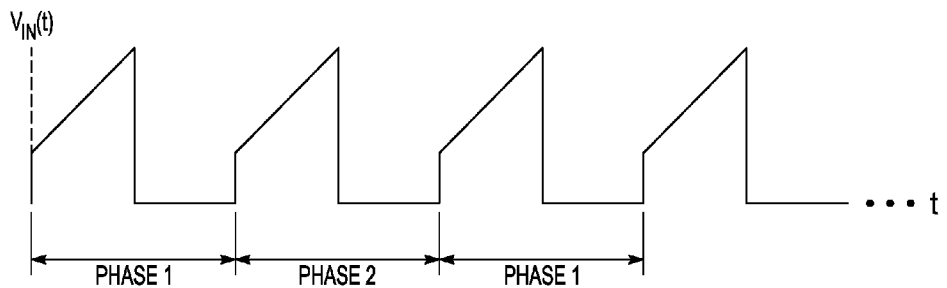
FIGS. 2A through 2C illustrate generally illustrative examples of an input voltage signal that can include a rectified representation of a time-varying current through a primary side of an isolation transformer of a switched-mode power converter, such as in a balanced operating state as in FIG. 2A, an unbalanced stated as in FIG. 2B, and in a state where the isolation transformer is saturating in a first phase in FIG. 2C.
Figure 2B:
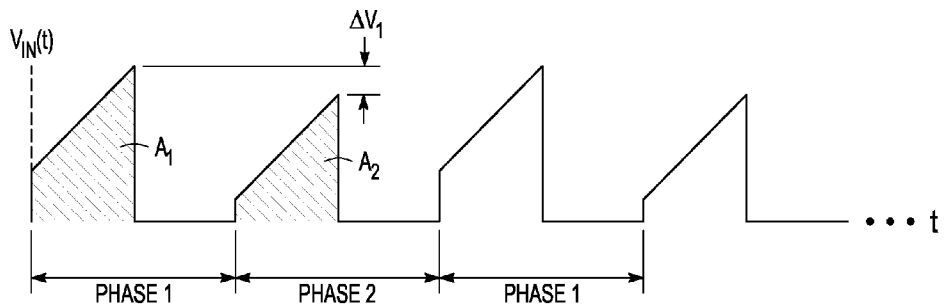
Figure 2C:
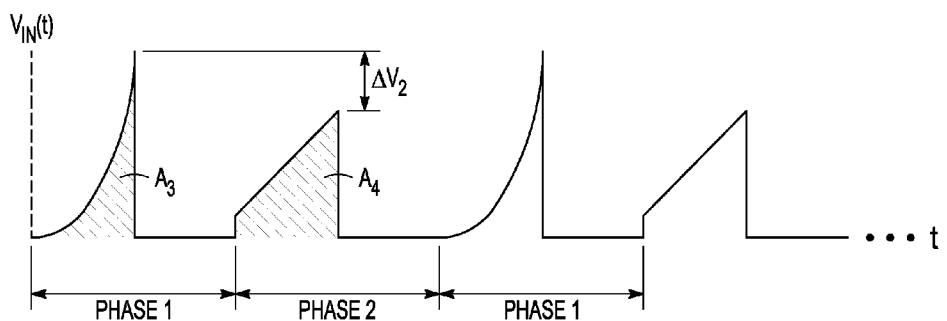

FIGS. 2A through 2C illustrate generally illustrative examples of an input voltage, $V_{IN}(t)$, that can include a representation (e.g., a rectified or "magnitude" representation) of a time-varying current through a primary side of an isolation transformer of a switched-mode power converter, such as in a balanced operating state as in FIG. 2A, an unbalanced stated as in FIG. 2B, and in a state where the isolation transformer is saturating in a first phase in FIG. 2C.

In FIGS. 2A through 2C, the voltage $V_{IN}(t)$ indicative of a current flowing through the primary side of the isolation transformer can include a first switching phase, PHASE 1, corresponding to a first current polarity established by the bridge network and a second switching phase, PHASE 2, corresponding to an opposite second current polarity established by the bridge network. In FIG. 2A, an area under each the triangular waveforms included in PHASE 1 and PHASE 2 is about equal, indicating a "balanced" operating condition. The linear ramping shape of each of the waveforms in PHASE 1 and PHASE 2 indicates that the operating condition of the transformer corresponding to the example shown in FIG. 2A is unsaturated.

In the illustration of FIG. 2B, an area A1 of the waveform corresponding to PHASE 1 is shown as greater than an area A2 corresponding to PHASE 2. This condition indicates an unbalanced condition, wherein a net magnetic flux can persist in the isolation transformer from cycle-to-cycle. The waveforms in FIG. 2B still appear linear, so the transformer corresponding to the example shown in FIG. 2B is not yet saturated, but may become saturated if the unbalanced condition persists.

In one approach, a control technique that estimates areas A1 and A2 can detect the greater area under A1 and modulate a pulse width controlling one or more of the switches in the bridge network. Such modulation can include one or more of shortening an on-duration of certain switches in the bridge network during subsequent cycles corresponding to PHASE 1 (e.g., reducing A1), or lengthening an on-duration of certain switches in the bridge network during subsequence cycles corresponding to PHASE 2 (e.g., increasing A2), so that the areas A1 and A2 converge. For example, an integral can be used to approximate or estimate the "volt-second" areas A1 and A2 to apply feedback as described above. Such an integral can include either a continuous-time integration, or a discrete time summation approximating such a continuous-time integration. Use of the phrase "integral" or "integrate" herein can generically refer to either a continuous-time or discrete-time determination.

The present inventors have also recognized that the "volt-second" integration technique can have limitations. For example, in FIG. 2C, the transformer reaches saturation during at least one of the phases (e.g., PHASE 1). In this example, an area A3 under the waveform of PHASE 1 can be less than the area A4 under the waveform of PHASE 2, because of the distortion of the waveform during PHASE 1, in a saturated condition. If the volt-second technique is used as described above in relation to FIG. 2B (e.g., integrating area under the waveform to estimate volt-second balance) the transformer might be driven further into saturation because, for example, lengthening an on-duration of the switches during the first phase will further exacerbate transformer saturation.

U.S. Pat. No. 7,529,108 to Anthonius Bakker (assigned to Analog Devices, Inc. of Norwood, Mass., U.S.A.), which is incorporated by reference herein in its entirety, is directed toward a digital controller and control method for a full-bridge power converter that are intended to avoid volt-second imbalance. The present inventors have recognized that the system and method described in U.S. Pat. No. 7,529,108 can have a potential limitation in that, if the transformer saturates, the waveforms can distort to the point that the time integral of the current control technique used in U.S. Pat. No. 7,529,108 may not be effective to restore balance and reduce or minimize any transformer saturation that is occurring.

Accordingly, the present inventors have recognized, among other things, that another technique of detecting how close a phase is to saturation is to compare how high the peaks in each of the opposing phases are, relative to each other. Instead of integrating or summing an area of the waveform over an entire phase, improved performance can be obtained by sampling and holding a peak value in a first phase, and comparing such a peak value to an opposite second phase. For example, a difference in peak values can indicate an unbalanced condition, a sign of such difference can indicate a polarity of such imbalance, and a magnitude of such difference can indicate a degree of imbalance (e.g., a greater difference indicates a greater degree of imbalance).

For example, the waveforms shown in FIGS. 2B and 2C have different morphologies (e.g., including linear ramp waveform shapes in the unsaturated condition as shown in FIG. 2B, and including a distorted non-linear waveform in the saturated condition as shown in FIG. 2C). Using a peak sampling technique, a difference in peaks, $\Delta V_1$, for the unbalanced, unsaturated example of FIG. 2B is the same sign as a difference in peaks $\Delta V_2$, for the balanced, saturated example of FIG. 2C. Such a monotonic change in the difference in peak values can be used to provide a feedback signal to suppress or reverse volt-second imbalance in both saturated and unsaturated operating conditions.

Figure 3:
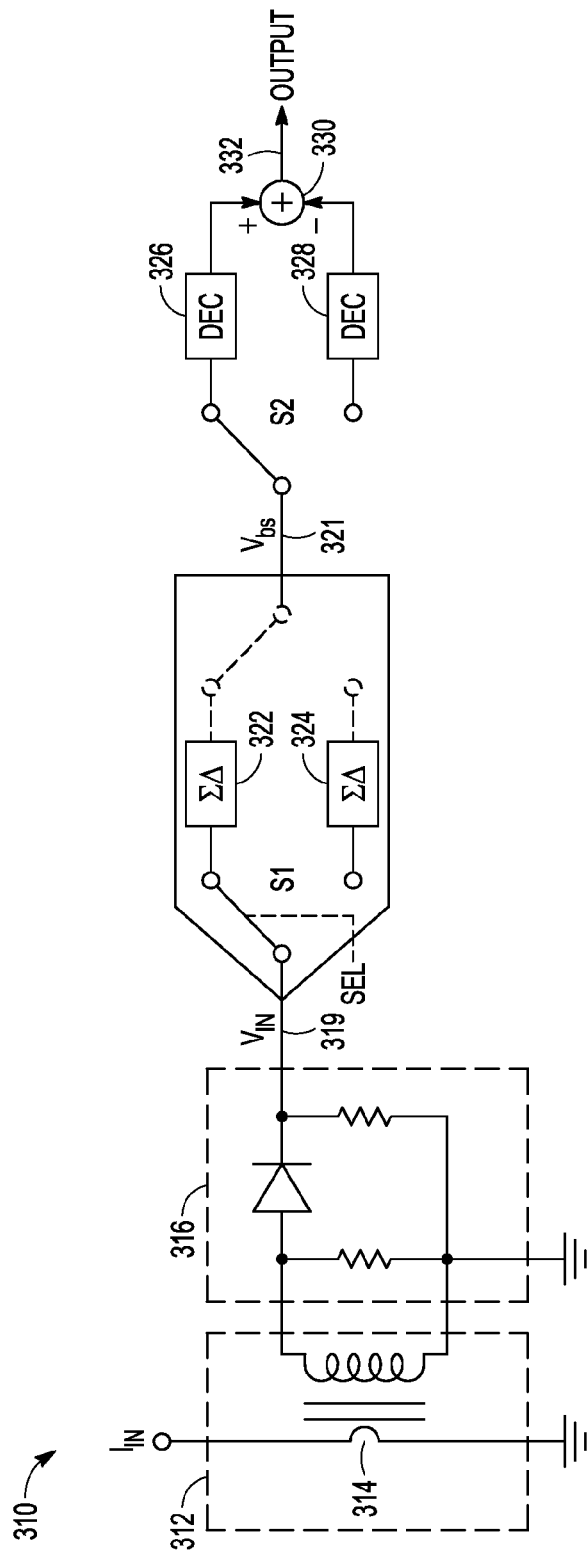
FIG. 3 illustrates generally a portion of a control circuit for a switched-mode power converter circuit, such as can include a current-to-voltage converter, a rectifier, one or more analog-to-digital converters, one or more decimators, and a difference determination circuit.

FIG. 3 illustrates generally a portion 310 of a control circuit for a switched-mode power converter circuit, such as can include a current-to-voltage converter 312, such as including a current-to-voltage transformer (e.g., a current transformer 314), a rectifier 316, one or more analog-to-digital converters, such as a first sigma-delta converter 322 or a second sigma-delta converter 324, one or more decimators such as a first decimator 326, or a second decimator 328, and a difference determination circuit 330. In the illustrative example of FIG. 3, a DC voltage, $V_{IN}$, (or a current, $I_{IN}$, that varies with $V_{IN}$) can be applied to an input 319 of a sigma-delta modulator circuit.

The sigma-delta modulator circuit can be arranged to provide a digital representation of $I_{IN}$, such as integrating $I_{IN}$ and provide the integrated signal as a bit stream ($V_{bs}$) that can be provided at an output 321 of the sigma-delta modulator circuit. The sigma-delta modulator can include a first sigma-delta modulator 322 or a second sigma-delta modulator 324. The sigma-delta modulator circuit can also include a switch S1 that can be configured to direct $I_{IN}$ to one or the other of the converters 322 or 324. The control circuit 310 can also include first and second decimation filters 326 and 328. A switch S2 can be configured to direct $V_{bs}$ to one or the other of the decimation filters 326 or 328

The states of one or more of S1 and S2 can be controlled such as corresponding to a signal, "SEL." The signal, SEL can toggle in synchronization with, and at the same frequency (FSW), as the switches A through D as shown in the example of FIG. 1. For example, during a first switching phase, PHASE 1, $I_{IN}$ can be directed (via S1) to (and integrated by) the sigma-delta modulator 322, and the bit stream $V_{bs}$ can be directed during PHASE 1 (via S2) to the decimation filter 326, which can decimate $V_{bs}$, such as to provide a first digital word. Similarly, during a second switching phase, PHASE 2, $I_{IN}$ can be directed (via S1) to (and integrated by) the sigma-delta modulator 324, and the bit stream $V_{bs}$ can be directed to the decimation filter 328, which can decimate $V_{bs}$ to provide a second digital word. The control circuit 310 can be arranged provide a digital representation of a difference between the first and second digital words at node 332, such as using a difference determination circuit 330.

An imbalance between a first current corresponding to a first switching phase and a second current corresponding to a second phase can result from a volt-second imbalance associated with the isolation transformer. Accordingly, the difference provided at node 332, such as between the digital word values provided by the decimation filters 326 and 328, can be used to adjust the widths of the pulses driving switches A through D so as to reduce or eliminate any current imbalance, and thereby reduce or eliminate any volt-second imbalance.

In the illustration of FIG. 3, a difference value, OUTPUT, can be provided to a PWM generator circuit. The PWM generator circuit can be arranged to generate and adjust pulses used to control the states of switches A through D, such as to tend to reduce or minimize the difference at OUTPUT. In this way, volt-second imbalance can be reduced or eliminated. When so arranged, the switches A through D and the circuitry shown in FIG. 3 can form a control loop. The bandwidth of this control loop can be much lower than a switching frequency at which switches A through D are operated.

The analog-to-digital converter (ADC) function performed by the sigma-delta modulator and the respective decimation filters 326 and 328 can be performed with a high-speed, high-resolution ADC circuit. However, such an ADC can have a higher cost and may exhibit accuracy issues that can arise due to noise from the current transformer. By contrast, the configuration shown in FIGS. 1 and 3 can be provided at lower cost, and can provide a much higher linearity than a configuration using an ADC circuit. The additional cost of adding a second integrator in the sigma-delta modulator can be negligible compared with the cost of a high-speed ADC circuit that could otherwise be used to sample and compare the sensed currents within one switching period.

Figure 4:
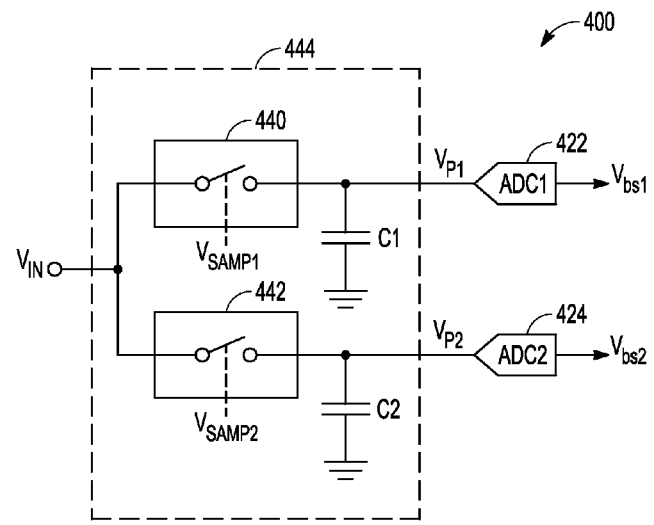
FIG. 4 illustrates generally a portion of a control circuit for a switched-mode power converter circuit, such as can include one or more sample-and-hold circuits, and one or more analog-to-digital converters.

FIG. 4 illustrates generally a portion 400 of a control circuit for a switched-mode power converter circuit, such as can include one or more sample-and-hold circuits, and one or more analog-to-digital converters. A limitation of using a sigma-delta modulator as shown generally above in relation to FIG. 3 is its slower speed. The slower speed can inhibit or prevent use of a sigma-delta modulator in an application needing a sampling speed on the order of several hundred kilohertz (kHz), as may be case for certain approaches to the volt-second balance control method described herein.

By contrast, the configuration shown in FIG. 4 can overcome this limitation, however, such as by separating the PHASE 1 and PHASE 2 current signals into separate bit stream representations. Control of bridge network pulse widths can be done, such as using such bit stream information after decimation. In this way, the control loop bandwidth can be much lower than the frequency FSW at which the switches are toggled.

As mentioned above and elsewhere herein, a potential limitation of the "time integral of the current technique" that can be implemented by the circuit of FIG. 3 is that if the transformer 100 saturates, the waveforms established at node 319 can distort during saturation to the point that time integral of the current will not usable as a means of restoring balance because such time integration may erroneously drive the pulse width modulation in a direction that worsens or maintains such saturation.

FIG. 4 shows an illustrative example of a peak sample-and-hold circuit 444 that can be used (and illustrative accompanying signals vs. time), such as can be inserted in series at node 319 shown in FIG. 3, such as to replace the "SEL" switch (S1) in FIG. 3. Information from the digital controller 134 (e.g., as shown in FIG. 1) can be used to time the sample and hold circuit for synchronously performing the peak sampling, which can avoid the need for using an asynchronous peak detection circuit. This is possible because the peak will occur at a deterministic location of the switching phase PWM signal, such as at the end of a switching phase or within a specified time offset from the beginning or end of a switching phase. Thus, peak voltage information can be captured synchronously using the PWM signal timing, which can avoid any need to provide a complex asynchronous peak detection circuit. An asynchronous peak detection scheme could also introduce inaccuracy into the system, such as if it were to be erroneously triggered by noise.

Figure 5:
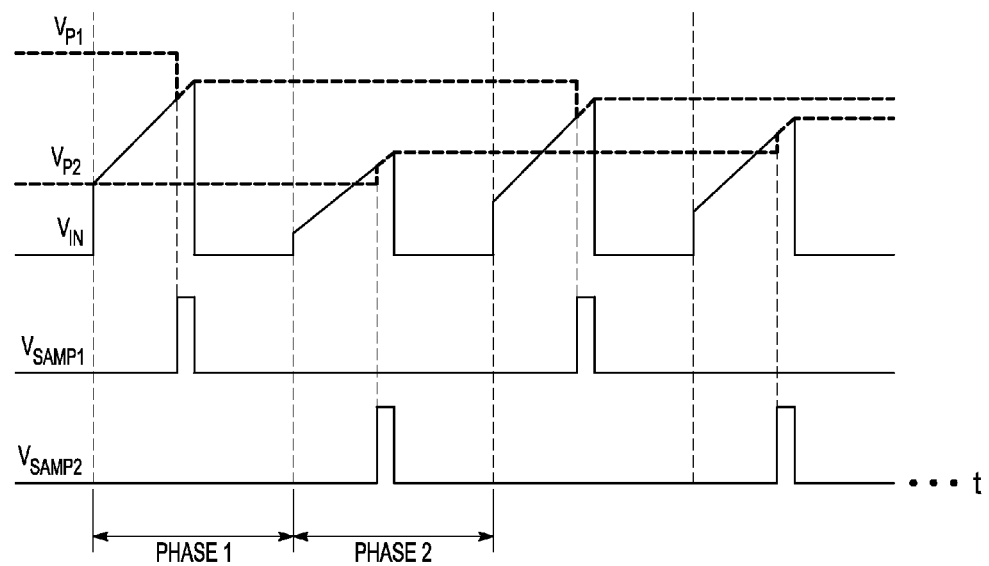
FIG. 5 illustrates generally an illustrative example of a peak sampling technique, such as can be performed synchronously with one or more switching converter control signals, such as can use the sample-and-hold topology shown in FIG. 4 or other examples herein.

In the example of FIG. 4, a first sampling switch 440 can be controlled using a first sampling signal, $V_{SAMP1}$, such as to store a representation of the input $VI_N$ on capacitor C1. As shown in FIG. 5, $V_{SAMP1}$ can be synchronized with a first switching cycle (e.g., PHASE 1) so that a representation of a portion of the primary current waveform including the peak is stored on capacitor C1. An analog-to-digital converter circuit 422 (e.g., a sigma-delta modulator circuit) can digitize the stored peak voltage, $V_{P1}$, to provide a first bit stream $V_{bs1}$. Similarly, a second sampling switch 442 can be controlled using a second sampling signal, $V_{SAMP2}$, such as to store a representation of the input $V_{IN}$ on capacitor C2. As shown in FIG. 5, $V_{SAMP2}$ can be synchronized with a second switching cycle (e.g., PHASE 2) so that a representation of a portion of the primary current waveform including the peak is stored on capacitor C2. A second analog-to-digital converter circuit 424 (e.g., a sigma-delta modulator circuit) can digitize the stored peak voltage, $V_{P2}$, to provide a second bit stream $V_{bs2}$. Other peak determination circuits and techniques can be used, such as an asynchronous peak detection scheme. The synchronous peak sampling technique described above and below includes a benefit of improved noise immunity and simple implementation, as compared to asynchronous approaches.

Figure 6:
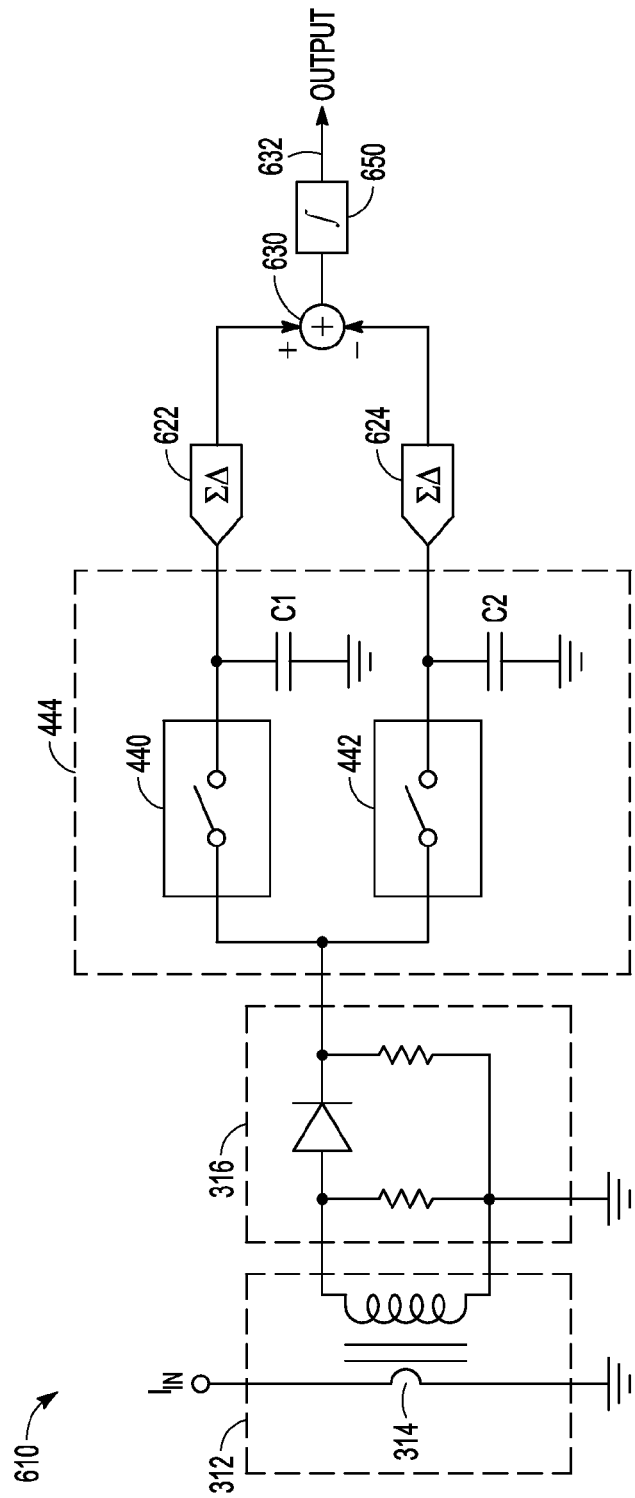
FIG. 6 illustrates generally a portion of a control circuit for a switched-mode power converter circuit, including the current-to-voltage converter topology of FIG. 3, along with the sample-and-hold topology of FIG. 4, along with a difference integrator.

FIG. 5 illustrates generally an illustrative example of a peak sampling technique, such as can be performed synchronously with one or more switching converter control signals, such as can use the sample-and-hold topology discussed in relation to other examples herein. In FIG. 5, a first sampling control signal, $V_{SAMP1}$, can be generated synchronously using information about the first switching phase (e.g., using information about a start or end time of the first switching phase, PHASE 1). $V_{P1}$ can track $V_{IN}$ when $V_{SAMP1}$ is asserted, and $V_{P1}$ can store a peak representation after $V_{SAMP1}$ is de-asserted, such as using a configuration as shown in the examples of FIG. 4 or FIG. 6. Similarly, a second sampling control signal, $V_{SAMP2}$, can be generated synchronously using information about the second switching phase (e.g., PHASE 2). $V_{P2}$ can track $V_{IN}$ when $V_{SAMP2}$ is asserted, and $V_{P2}$ can store a peak representation after $V_{SAMP2}$ is de-asserted, again using a configuration as shown in the examples of FIG. 4 or FIG. 6.

The analog-to-digital converter (ADC) circuits 422 and 424 shown in FIG. 4 can be implemented using a variety of configurations. For example, such ADCs can be implemented as sigma delta modulators (e.g., sigma-delta modulators 322 and 324 as shown in FIG. 3) in combination with switch S2 and respective decimation filters 326 and 328, such as described herein with respect to FIG. 3. But, using the switch S2 as shown in FIG. 3 may cause issues when the frequency of the phases increases to be comparable to the frequency of the outputs of the sigma-delta modulators 322 and 324.

In another approach, such ADC circuits 422 and 424 can be implemented using sigma-delta modulators such as described in U.S. Provisional Patent Application Ser. No. 61/824,837, titled "SIGMA-DELTA DIFFERENTIATOR," filed May 17, 2013, or U.S. patent application Ser. No. 14/166,486, titled "TIME-INTERLEAVED SINGLE INPUT DUAL OUTPUT SIGMA-DELTA MODULATOR," each which is hereby incorporated herein in its respective entirety, such as including examples omitting a switch corresponding to switch S2 as referenced herein.

FIG. 6 illustrates generally a portion 610 of a control circuit for a switched-mode power converter circuit, including the current-to-voltage converter topology of FIG. 3, along with a sampling circuit 444 similar to the sample-and-hold circuit topology of FIG. 4, along with an integrator 650 coupled to an output of a difference determination circuit 630. As in FIG. 3, the current monitoring circuit 312 can include a current transformer 314 or other current-to-voltage converter circuit. An output of the current monitoring circuit 312 can be rectified or otherwise processed, such as using a rectifier circuit 316. The resulting rectified signal can be sampled, such as using a first sampling switch 440 to store a representation of the rectified signal on a first sampling capacitor C1 (e.g., for a first switching phase), or using a second sampling switch 442 to store a representation of a rectified signal on a second sampling capacitor C2 (e.g., for a second switching phase). As mentioned in relation to the examples of FIGS. 4 and 5, such a sampling configuration can be used to sample a peak of the voltage $V_{IN}$ in synchronization with one or more switching cycles comprising one or more switching phases.

In using a transformer current sample-and-hold technique, such as for PWM control, it can be desirable not to react too quickly to a spurious transient voltage. Any corrections, such as to reduce or suppress imbalance, can be made slowly and based on a longer term average of the peak information (e.g., over a duration of more than one switching cycle). In one approach, such averaging can be obtained using a configuration of a slow integrating sigma-delta modulator, decimation filters, and a difference circuit to provide an output indicative of imbalance, as shown in the example of FIG. 3.

In another approach, such as shown in the example of FIG. 6, a subtraction of individual bit streams provided by sigma-delta modulators 622 and 624 can be performed, such as then integrating such a difference using the integrator circuit 650 to provide an integrated output 632, OUTPUT. Using this configuration, there is no need to include decimation filters. For example, a sigma-delta conversion and integration technique can be implemented using sigma-delta modulators such as described in U.S. Provisional Patent Application Ser. No. 61/824,837, titled "SIGMA-DELTA DIFFERENTIATOR," filed May 17, 2013, or U.S. patent application Ser. No. 14/166,486, titled "TIME-INTERLEAVED SINGLE INPUT DUAL OUTPUT SIGMA-DELTA MODULATOR," each of which is hereby incorporated herein in its respective entirety. Using such sigma-delta modulators, bit stream subtraction can be performed, without requiring decimation.

One or more of the circuits shown in FIGS. 1, 3 through 4, or 6 can be included as a portion of a commonly-shared integrated circuit or within a commonly-shared integrated circuit package. For example, one or more of the control circuit 134 shown in FIG. 1, the sampling circuit 444, the ADCs 422 or 424 (e.g., sigma-delta modulators 622 or 624), the difference determination circuit 630, or the digital integrator 650 can be included as a portion of a commonly-shared integrated circuit or within a commonly-shared integrated circuit package.

Figure 7:
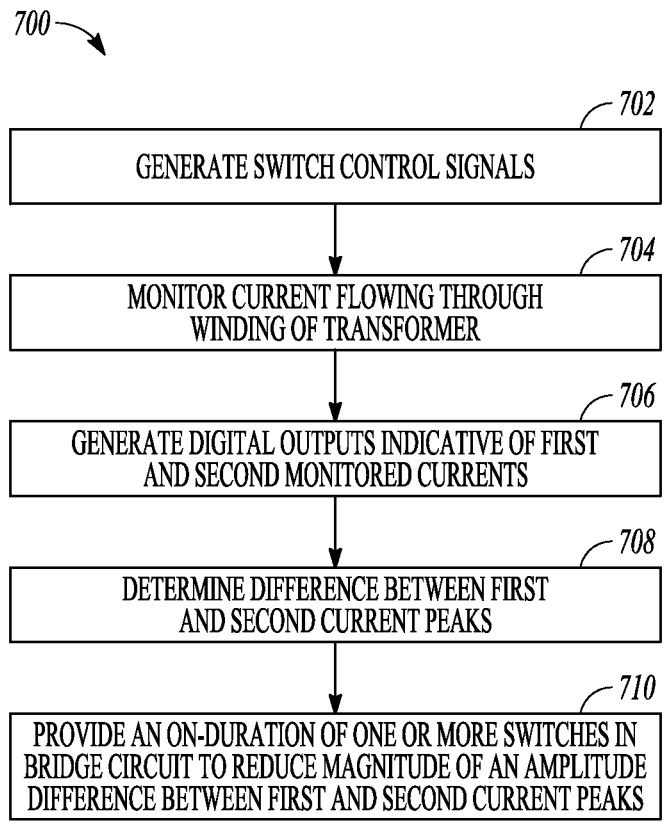
FIG. 7 illustrates generally a technique, such as a method, that can include generating switch control signals for a switched-mode power converter such as including using information obtained by sampling peaks of a waveform corresponding to a transformer current.

FIG. 7 illustrates generally a technique 700, such as a method, that can include generating switch control signals for a switched-mode power converter such as including using information obtained by sampling peaks of a waveform corresponding to a transformer current. At 702, a switch control signal can be generated. For example, such a switch control signal can be generated using a switch control circuit included as a portion of an integrated circuit. Such switch control signals can be coupled to a bridge network. The bridge network can include an array of transistor, such as to couple power input nodes to an isolation transformer according to specified switch states.

At 704, a current can be monitored, such as a current flowing through a primary winding of the isolation transformer. The current monitoring circuit can include a passive portion, such as a current transformer or resistor, or an active current monitoring circuit such as a transconductance amplifier or other circuit. In an example, a first current can be monitored during a first sampling duration corresponding to a first current polarity established by the bridge network and a second current can be monitored during a second sampling duration corresponding to an opposite second current polarity established by the bridge network.

At 706, digital outputs indicative of first and second monitored currents can be generated, such as using a sampling circuit to obtain information indicative of peaks of the first and second monitored currents, and such as using an analog-to-digital converter to convert the sampled currents into digital representations.

At 708, a difference between the representations of the first and second current peaks can be determined. For example, such a difference determination can include determining a difference between digital bit streams provided by first and second analog-to-digital converters (ADCs), such as can include sigma-delta modulators as discussed in various examples elsewhere herein.

At 710, an on-duration of one or more switches in the bridge circuit can be provided, such as to reduce a magnitude of an amplitude difference between the first and second current peaks, such as an amplitude difference indicated by the determined difference obtained at 708.

Various Notes & Examples

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A switched-mode power conversion circuit, comprising:
   a switch control circuit including switch control outputs coupleable to switches included in a bridge network, the switches controllably coupling power input nodes to an isolation transformer according to switch states established by the switch control circuit;
   a current monitoring circuit coupleable to the isolation transformer, the current monitoring circuit including an output indicative of a current flowing through a winding of the isolation transformer;
   a sampling circuit coupled to the output of the current monitoring circuit to obtain information indicative of a first current peak during a first sampling duration corresponding to a first current polarity established by the bridge network and a second current peak during a second sampling duration corresponding to an opposite second current polarity established by the bridge network;
   an analog-to-digital converter including an input coupled to the sampling circuit, the analog-to-digital converter including a digital output indicative of the first current peak and the second current peak;
   wherein the switch control circuit is coupled to the digital output of the analog-to-digital converter;
   wherein the switch control circuit includes a difference circuit comprising inputs respectively arranged to receive the digital output indicative of the first current peak and the second current peak, and a digital output indicative of a difference between the first and second current peaks;
   wherein the switch control circuit includes an input coupled to the digital output indicative of a difference between the first and second current peaks; and
   wherein the switch control circuit is arranged to provide an on-duration of one or more switches in the bridge circuit established at least in part to reduce an amplitude difference between the first and second current peaks.

2. The switched-mode power conversion circuit of claim 1, wherein the control circuit is arranged to trigger the first sampling duration in synchronization with a first switching phase wherein the first current polarity is established by the bridge network; and
   wherein the control circuit is arranged to trigger the second sampling duration in synchronization with a second switching phase wherein the second current polarity is established by the bridge network.

3. The switched-mode power conversion circuit of claim 2, wherein the sampling circuit comprises:
   a first sample-and-hold circuit including a first sampling switch, the first sample-and-hold circuit arranged to hold the information indicative of the first current peak using the first sampling switch; and
   a second sample-and-hold circuit including a second sampling switch, second first sample-and-hold circuit arranged to hold the information indicative of the second current peak using the second sampling switch.

4. The switched-mode power conversion circuit of claim 3, wherein the analog-to-digital converter includes:
   a first sigma-delta converter circuit including an input coupled to the first sample-and-hold circuit and a first digital output; and a second sigma-delta converter circuit including an input coupled to the second sample-and-hold circuit and a second digital output;

wherein the first and second digital outputs are coupled respective inputs of the difference circuit.

5. The switched-mode power conversion circuit of claim 4, wherein the first and second digital outputs are coupled to respective digital inputs of the difference circuit via respective decimators.

6. The switched-mode power conversion circuit of claim 4, wherein the digital output of the difference circuit is coupled to a digital integrator circuit; and wherein an output of the digital integrator circuit is coupled to the switch control circuit for use by the switch control circuit to establish an on-duration of one or more switches in the bridge circuit at least in part to reduce an amplitude difference between the first and second current peaks.

7. The switched-mode power conversion circuit of claim 1, wherein a blocking capacitor is not required in series with the primary winding.

8. The switched-mode power conversion circuit of claim 1, wherein the current monitoring circuit includes a current-to-voltage converter circuit.

9. The switched-mode power conversion circuit of claim 8, wherein the current-to-voltage converter circuit includes a current transformer having a primary winding in series with the primary winding of the isolation transformer.

10. The switched-mode power conversion circuit of claim 8, wherein the current-to-voltage converter circuit includes a rectifier circuit to provide an output indicative of a magnitude of a current amplitude flowing through the primary side of the isolation transformer.

11. The switched-mode power conversion circuit of claim 1, wherein the control circuit includes an input coupled to a rectified output of the secondary side of the isolation transformer.

12. The switched-mode power conversion circuit of claim 11, wherein the rectified output comprises a full-wave-rectified output via a filter network to the input of the control circuit.

13. The switched-mode power conversion circuit of claim 11, wherein the switch control outputs of the control circuit are controlled to generate pulse widths modulated to regulate a voltage provided at the rectified output of the secondary side of the isolation transformer.

14. The switched-mode power conversion circuit of claim 1, further comprising: the
bridge network including the switches; and
the isolation transformer.

15. The switched-mode power conversion circuit of claim 14, wherein the switches include four transistors arranged in an H-bridge configuration; and wherein the switch control outputs are coupled to respective control inputs of each of the four transistors.

16. The switched-mode power conversion circuit of claim 1, wherein the a switch control circuit, at least a portion of the current monitoring circuit, the sampling circuit, and the analog-to-digital converter are co-integrated as a portion of an integrated circuit.

17. A switched-mode power conversion circuit, comprising:

a switch control means to control switches included in a bridge network to couple power input nodes to an isolation transformer according to specified switch states;

a current monitoring means coupleable to the isolation transformer to provide an output indicative of a current flowing through a winding of the isolation transformer;

a sampling means to obtain information from the current monitoring means indicative of a first current peak during a first sampling duration corresponding to a first current polarity established by the bridge network and a second current peak during a second sampling duration corresponding to an opposite second current polarity established by the bridge network;

an analog-to-digital conversion means to provide a digital output indicative of the first current peak and the second current peak;

wherein the switch control means receives the digital output indicative of the first current peak and the second current peak to provide a digital output indicative of a difference between the first and second current peaks; and wherein the switch control means provides an on-duration of one or more switches in the bridge circuit at least in part to reduce an amplitude difference between the first and second current peaks indicated by the digital output indicative of the difference between the first and second current peaks.

18. A method of operating a switched-mode power conversion circuit, comprising:

generating switch control signals coupleable to switches in a bridge network, the switches controllably coupling power input nodes to an isolation transformer according to specified switch states;

monitoring a current flowing through a winding of the isolation transformer;

using the monitoring, generating digital outputs indicative of a first current peak during a first sampling duration corresponding to a first current polarity established by the bridge network and a second current peak during a second sampling duration corresponding to an opposite second current polarity established by the bridge network; and determining a difference between the first and second current peaks;

wherein generating the switch control signals includes providing an on-duration of one or more switches in the bridge circuit established at least in part to reduce an amplitude difference between the first and second current peaks, using the determined difference between the first and second current peaks.

19. The method of operating the switched-mode power conversion circuit of claim 18, comprising triggering the first sampling duration in synchronization with a first switching phase wherein the first current polarity is established by the bridge network; and triggering the second sampling duration in synchronization with a second switching phase wherein the second current polarity is established by the bridge network.

20. The method of operating the switched-mode power conversion circuit of claim 19, comprising digitally integrating a determined difference between the first and second current peaks; and wherein generating the switch control signals includes providing the on-duration of one or more switches in the bridge circuit at least in part using the digitally integrated determined difference.

* * * * *